Dec. 13, 1949     R. THOMAS     2,491,018
METHOD AND APPARATUS FOR PRODUCING
MOTION PICTURES IN COLOR
Filed July 14, 1947     6 Sheets-Sheet 1
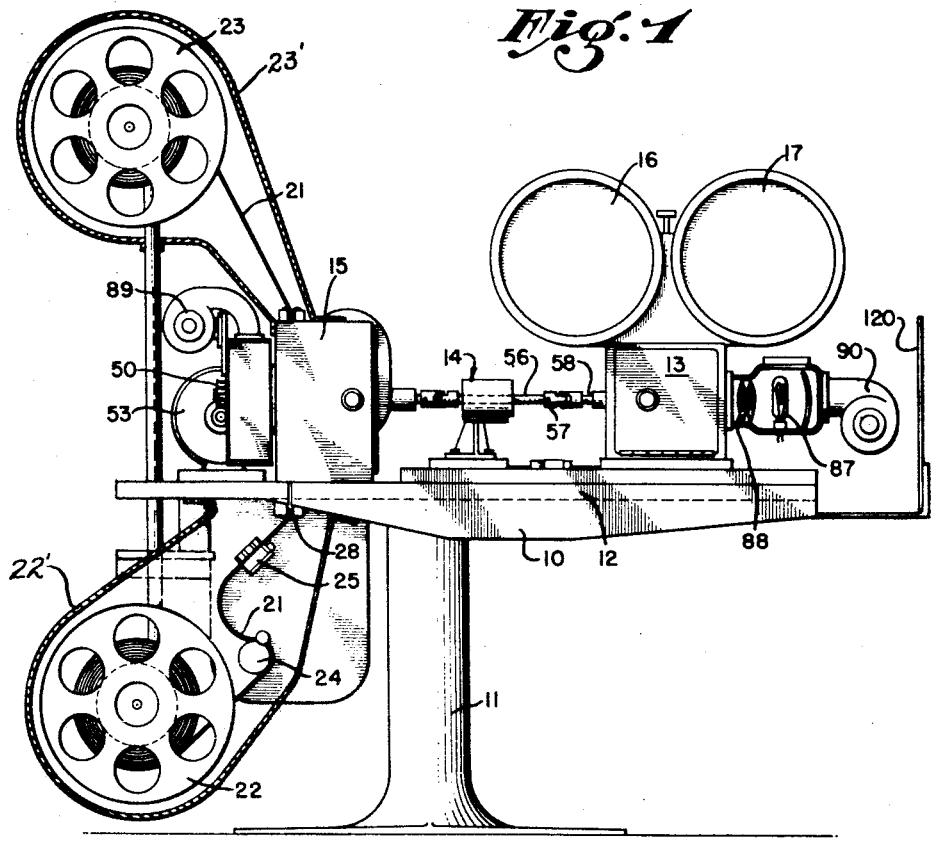
Fig. 1
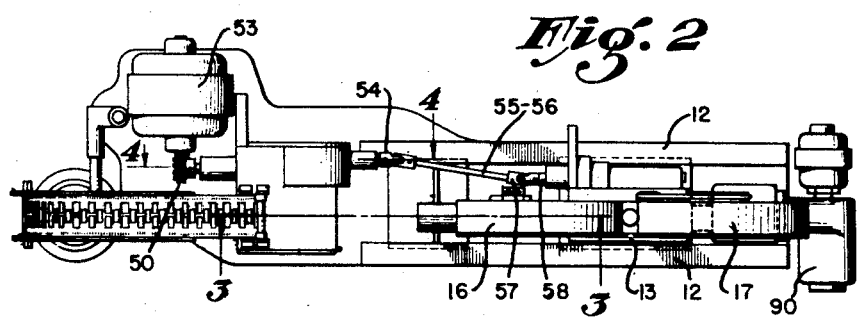
Fig. 2
Inventor:
RICHARD THOMAS,
Attorney Inventor:
RICHARD THOMAS.
Attorney

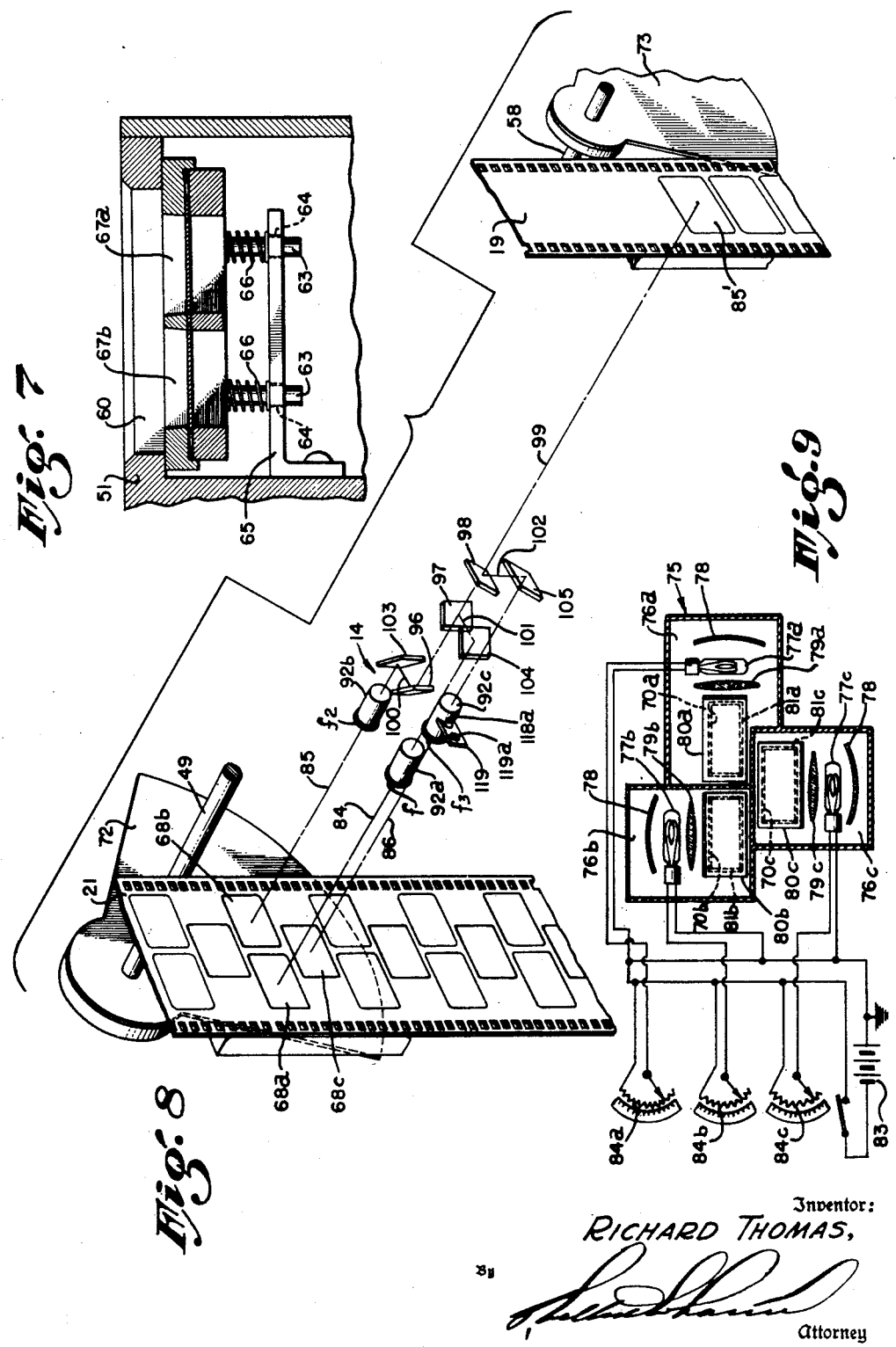

Dec. 13, 1949     R. THOMAS     2,491,018
METHOD AND APPARATUS FOR PRODUCING
MOTION PICTURES IN COLOR
Filed July 14, 1947     6 Sheets-Sheet 5

Inventor
RICHARD THOMAS,
BY
Attorney

Dec. 13, 1949 R. THOMAS 2,491,018
METHOD AND APPARATUS FOR PRODUCING
MOTION PICTURES IN COLOR
Filed July 14, 1947 6 Sheets-Sheet 6

Inventor:
RICHARD THOMAS,
By
Attorney

UNITED STATES PATENT OFFICE 2,491,018

METHOD AND APPARATUS FOR PRODUCING MOTION PICTURES IN COLOR

Richard Thomas, Westwood Village, Calif.

Application July 14, 1947, Serial No. 760,799

7 Claims. (Cl. 88—16.4)

My invention relates to the production of colored motion picture films wherein each frame constitutes a single colored transparency so that a colored motion picture film is obtained upon a screen by running the film through a projector of the common type employed for the projection of the so-called black and white motion pictures.

It is an object of the invention to provide a method and apparatus for producing in quantity colored positive motion picture film of the multiple emulsion type chemically processed after exposure to the colored lights comprising the image to produce a colored transparency from which to project a colored motion picture onto a screen by use of a projector having a source of white light. Multiple emulsion films are now obtainable which, when photographed in a camera from an object suitably lighted, will, when processed, provide a transparent colored picture in some instances having reasonable fidelity to natural color values, and in other instances being poorly balanced as to the strengths of the colors of which the picture is composed. My present invention provides for the reproduction of positive colored motion picture film from an original colored film obtained in a camera and for the revision or balancing of the color value so that the reproductions will have good color composition, regardless of the fidelity of the original. According to the present invention, color value separations are made from the consecutive frames of the original color film, these color value separations being formed in side by side relation on consecutive sections or frames of a color separation film by use of a light directing means, forming part of the invention, which divides the light image from each frame of the original colored film into a plurality of images which are passed through color filters so as to produce color value separations of the original colored image. This light directing means, or another of similar character, is subsequently employed to optically print the color value images of the color separation film in superimposed relation on a sensitized multiple emulsion film which is subsequently processed so as to produce a film carrying a well color balanced reproduction of the original from which the color value images of the color separation film were originally obtained.

In another practice for the invention the color separation film used for the purpose of optically printing sensitized multiple emulsion motion picture film, is obtained by procuring a positive print from a color separation negative obtained photographically from an original colored object or scene by use of a color camera arranged to produce side by side color value images or separations on the consecutive frames of a sensitized single emulsion or black and white motion picture film.

It is an object of the invention to provide color control means for adjusting the relative values or strengths of the colors entering into the color composition of the positive pictures or picture produced or reproduced by use of the invention.

A further object of the invention is to provide for the production of colored motion picture film images which are free from the effects of parallax as the result of the employment of the light directing means, forming a part of the present invention, which combines color value images received along separate optical axes, so that they will pass along a single optical axis to the focal plane of the triple emulsion which is to receive the colored picture.

It is an object of the invention to provide for the accurate registration of the colored images comprising the finished multiple emulsion positive film. In the present invention, the color separation images are formed in side by side relation on a single piece of film, so that the effects of shrinkage act equally through all of the image areas, due to the fact that all of the image areas are simultaneously subjected to the same processing comprising the processing undergone by the emulsions of the negative and positive films after their exposure to light, such processing being ordinarily referred to as development, but consisting of development of the images, washing, fixing, etc. It is a feature of the present invention that the color value images are grouped around a common center, and that the shrinkage of the negative and positive films is toward this common center, in addition to being equal throughout the areas, thereby making it possible to compensate for shrinkage of the areas and also to register the areas accurately in the optical printing of multiple emulsion films from the color value images of the positive color separation films made in accordance with my invention.

Further objects and advantages of the invention will be brought out in the following part of the specification, wherein detailed explanation of a preferred embodiment is given for the purpose of making a complete disclosure without limiting the scope thereof set forth in the appended claims.

Referring to the drawings which are for illustrative purposes only,

Fig. 1 is a side view of an apparatus forming part of my invention.

Fig. 2 is a plan view corresponding to Fig. 1.

Fig. 7 is a fragmentary sectional view taken as indicated by the line 7—7 of Fig. 5.

Fig. 8 is a schematic perspective view showing the light paths along which the photographic images are carried between the color separation film and the triple emulsion film employed in the disclosed embodiment of the invention.

Fig. 9 is a fragmentary sectional view of the light box of the color separation film advancing mechanism, taken as indicated by the line 9—9 of Fig. 3.

Figure 3:
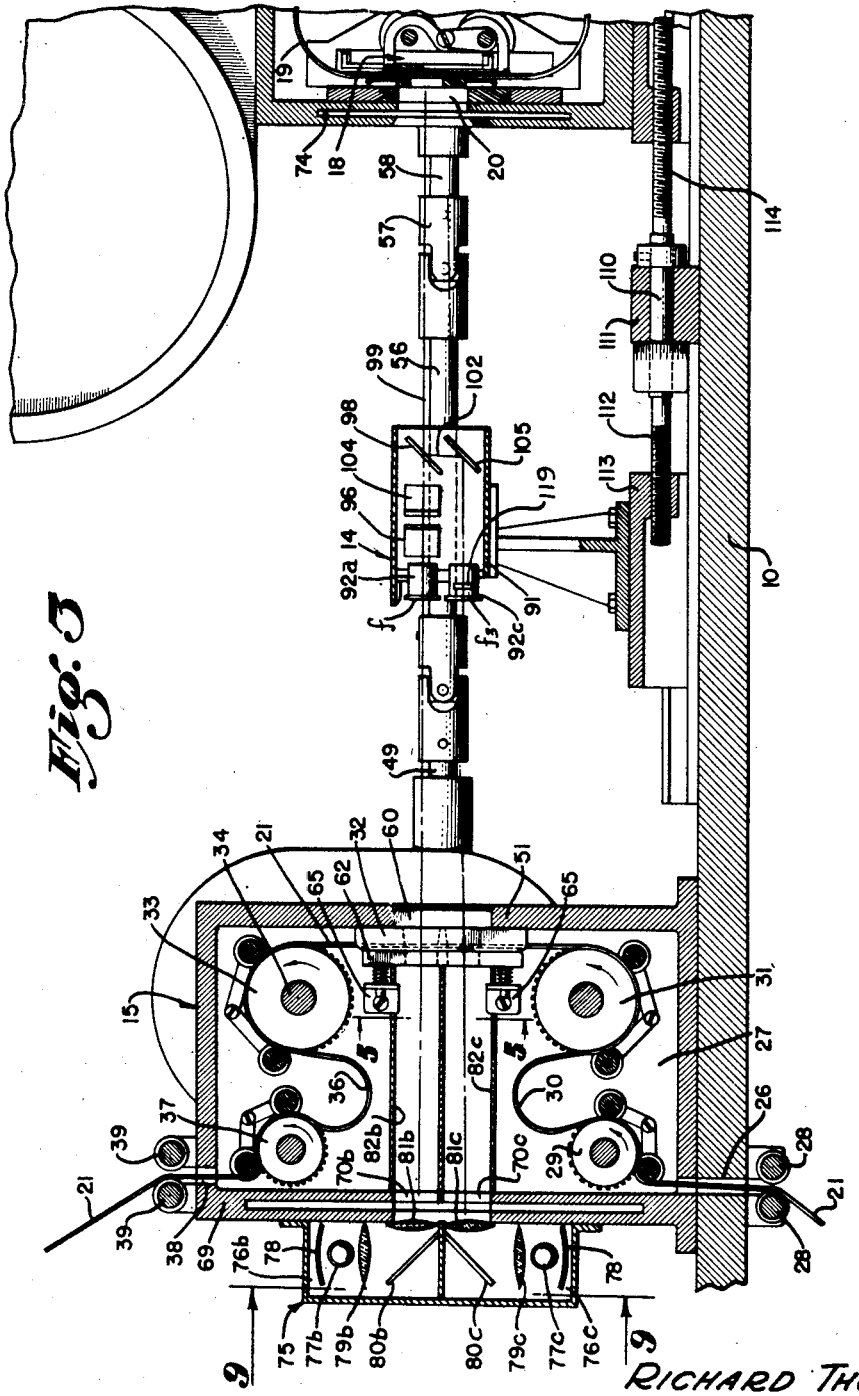
Fig. 3 is an enlarged fragmentary sectional view taken as indicated by the line 3—3 of Fig. 2; the light directing means of the device being schematically shown therein.

As shown in Figs. 1 and 2, the apparatus forming part of the present invention comprises an elongated table 10 supported at a convenient height by a pedestal 11, this table 10 having horizontal guide means 12 supporting a composite film handling mechanism 13 and a light directing means 14 in adjustable relation to a color separation film advancing mechanism 15. The light directing means 14 is shown schematically in Figs. 3 and 8, and is later herein described in detail with relation to Figs. 10 to 14 inclusive. The film handling mechanism 13 has holders 16 and 17 thereon for standard millimeter motion picture film reels. It will be understood that in the practice of my invention the film handling mechanism 13 may be made to accommodate film of any size, for example, the commercial sizes, 16 millimeter and 8 millimeter. For this film handling mechanism, I have employed a standard camera construction having therein, as shown in Fig. 3, a film advancing mechanism 18, further details of which are not shown for the reason that satisfactory film advancing mechanisms for this purpose are well known in the art. The film advancing mechanism 18 is adapted to move a film 19 so that consecutive frames thereof will be brought into position before an aperture 20. The film 19 is referred to as the composite film or colored transparency for the reason that it carries a complete or composite image composed of the different colors contained in the original colored object, scene or dramatic action which has been photographed or is to receive a colored composite image.

The color separation film advancing mechanism 15 is so called for the reason that it handles or advances a color separation film 21 which is taken from a reel 22 and wound upon a reel 23. The color separation film 21, as shown in Fig. 1, passes from the reel 22 over a guide pulley 24 and through a film cleaner 25 to an aperture 26, Fig. 3, leading into the casing 27 of the film advancing mechanism 15, there being guide rollers 28 disposed at the entrance to the aperture 26. The film 21 is held in engagement with a continuously moving sprocket 29 and thence through a film loop 30 to an idler sprocket 31 from which the film 21 is then carried up through a film guide 32 to an intermittent sprocket 33 mounted on a shaft 34 so as to be driven by a Geneva intermittent mechanism 35 shown in Fig. 4. From the intermittent sprocket 33, the film 21 then passes through a film loop 36, Fig. 3, to a constantly driven sprocket 37, from which sprocket 37 the film 21 then passes through an outlet aperture 38 and between guide spools 39 to the take-off reel 23. Wherever necessary, light guards may be employed for protecting unexposed and undeveloped film from light. Accordingly, in Fig. 1 I have shown guards 22' and 23' for protecting the film 21 during the time it is outside the film advancing mechanism 15, these guards 22' and 23' enclosing the spools 22 and 23 and the portions of the film 21 shown extending therefrom.

Figure 4:
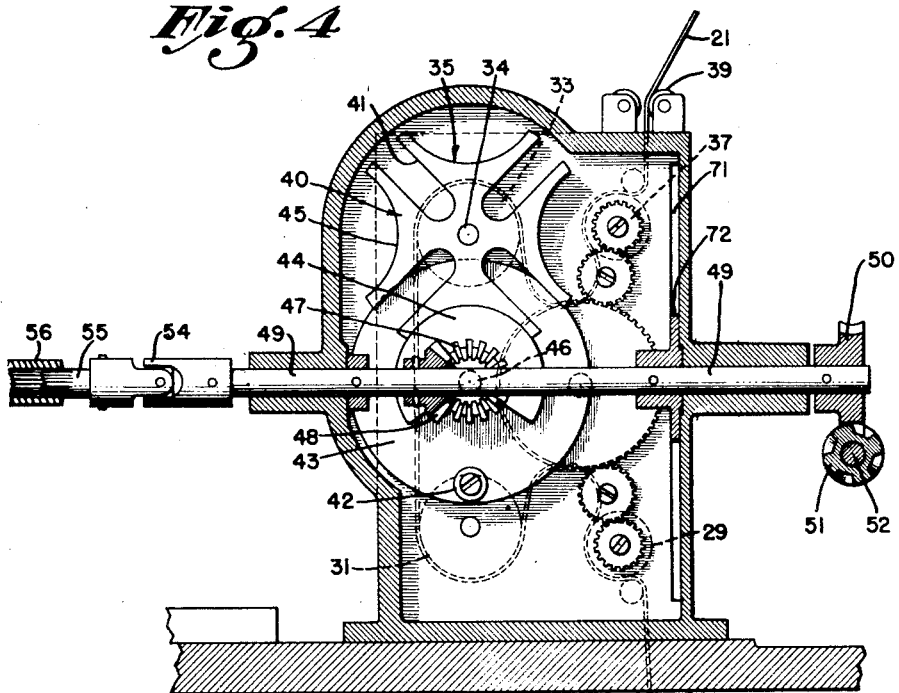
Fig. 4 is an enlarged fragmentary sectional view taken as indicated by the line 4—4 of Fig. 2.

As shown in Fig. 4, the Geneva mechanism 35 includes a Geneva wheel 40 having radial slots 41 arranged to be consecutively engaged by a cylindric driver 42 carried by a continuously rotating disc 43. The disc 43 carries a circular segment 44 arranged to engage the arcuate depressions 45 in the Geneva wheel 40 between the radial slots 41. The disc 43 is mounted on a shaft 46 and carries a bevel gear 47 so that it may be driven by a bevel gear 48 mounted on a continuously rotating shaft 49 which is driven by a worm wheel 50 engaged by a worm 51 mounted on the shaft 52 of a motor 53, Fig. 2. As shown in Figs. 2 and 4, the shaft 49 is connected through a universal or flexible coupling 54 with a shaft 55 which is axially slidable in a hollow shaft 56, connected by a flexible coupling 57 with the shaft 58 which drives the film advancing mechanism 18 of the composite film advancing mechanism 13, Fig. 3. The shaft 55 is splined in the hollow shaft 59 to provide for axial extension of the drive connection between the mechanisms 15 and 13 as the film mechanism 13 is moved along the guides 12 for image focusing purposes as will be hereinafter explained. Through the drive connection, between the mechanisms 15 and 13, just described, synchronized advancing movement of the films 19 and 21 is obtained.

Figure 5:
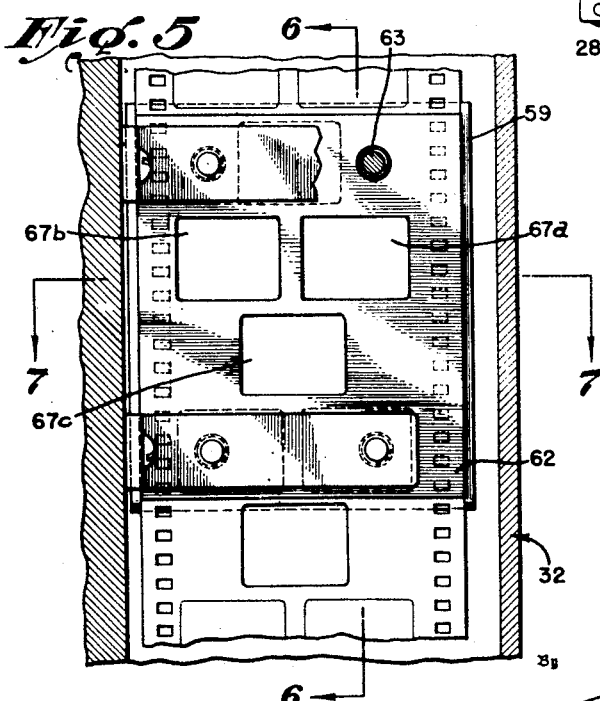
Fig. 5 is a further enlarged fragmentary view taken as indicated by the line 5—5 of Fig. 3.
Figure 6:
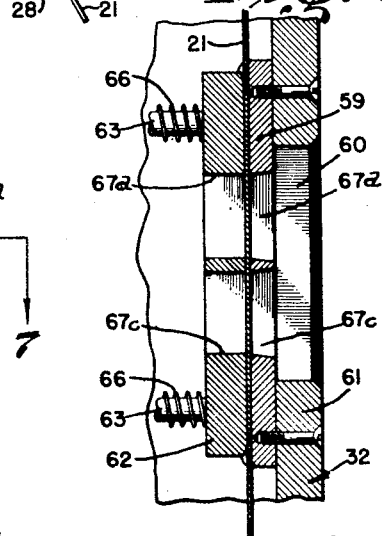
Fig. 6 is a fragmentary sectional view taken as indicated by the line 6—6 of Fig. 5.
Figure 10:
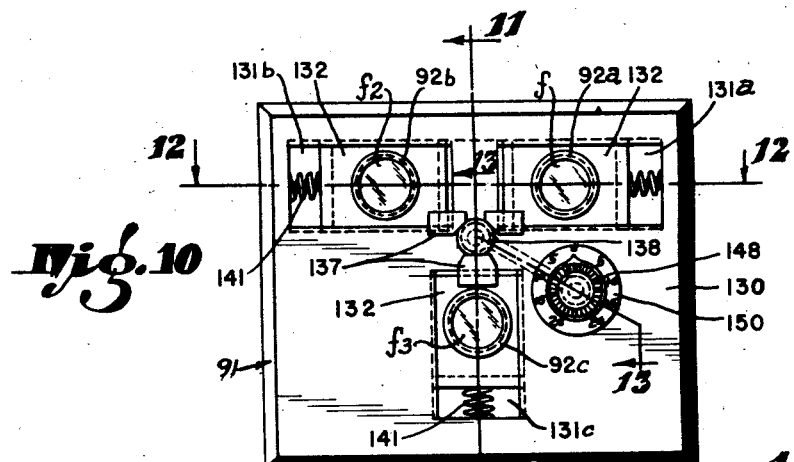
Fig. 10 is a view, to enlarged scale, of the leftward end of the light directing means.

As shown in Figs. 5, 6, and 7, the film guide 32 for the color separation film 21 comprises a plate 59 disposed across the inner end of the opening 60 in the front wall 61 of the casing 27. A movable plate 62 cooperates with the plate 59 to form a vertical path for the film 21. This movable plate 62 has pins 63 extending therefrom and passing through openings 64 in stationary brackets 65. Compression springs 66, disposed between the brackets 65 and the movable plate 62, urge the plate 62 toward the plate 59. The plates 59 and 62 have aligned windows 67 specifically identified as 67a, 67b, and 67c, exposing a plurality of rectangular areas of the section or frame of the film 21 disposed centrally of the guide 32. In the present form of the invention, three windows 67 are employed to correspond to the three color value images 68 formed on each section or frame of the film 21, as shown in Fig. 8, these color separation images being respectively identified as 68a, 68b, and 68c, the images 68a, 68b being in horizontal side by side relation and the image 68c being disposed adjacent the lower sides of the images 68a and 68b in centralized position. That is to say, the center of the image 68c is below the vertical space which separates the images 68a and 68b.

In the back wall 69 of the casing 27, Fig. 3, which houses the mechanism of the color separation film advancing means 15, there are windows 70, specifically identified as 70a, 70b and 70c, corresponding to the windows 67a, 67b and 67c of the plates 59 and 62. The wall 69 also has therein a slot 71, Figs. 3 and 4, in which a shutter 72, mounted on the shaft 49, is operative, this shutter 72, schematically indicated in Fig. 8, rotating in timed relation to a shutter 73 which moves through a slot 74, Fig. 3, in crossing relation to the aperture 20 of the film advancing mechanism 13, this synchronous operation of the shutters 72 and 73 being accomplished by the fixing of the same respectively on the shafts 49 and 50 which rotate in unison.

The purpose of the windows 70 in the rear wall 69 of the housing 27 is for the admission of beams of light from a light box 75, Figs. 1, 3 and 9, mounted on a rear wall 69 of the housing 27. The light box 75 has sections 76a, 76b and 76c arranged respectively so that they will communicate with the windows 70a, 70b and 70c, these sections having therein lamps 77 respectively indicated as 77a, 77b and 77c behind which reflectors 78 are placed. From the lamp 77a, light passes through a condenser lens 79a and is reflected by a diagonal mirror 80a toward the window 70a. This reflected light passes through a condenser lens 81a which is placed across the window 70a and thence through the window 70a and a tubular light duct 82a to the window 67a of the plate 62. Light from the lamp 77b passes through a condenser 79b and is reflected forwardly by a diagonal mirror or reflector 80b toward the window 70b. This reflected light then passes through a condenser 81b which is disposed across the window 70b, through the window 70b, and then through a tubular light duct 82b to the window 67b of the plate 62. Likewise, light from the lamp 77c passes through a condenser 79c, and is reflected forwardly by a mirror 80c toward the window 70c. This light then passes through a condenser 81c disposed across the window 70c and then through the window 70c and a tubular light duct 82c to the window 67c of the frame 62.

As shown in Fig. 9, the lamps 77a, 77b and 77c are connected respectively to a source of electric current, shown as a battery 83, through resistors 84a, 84b and 84c, adjustment of which resistors makes possible regulation of the intensities of the separate beams of light from the lamps 77a, 77b and 77c, which may be passed forwardly through the windows 67a, 67b, and 67c and the respective color value images 68a, 68b, and 68c of the color separation film 21. The purpose of this adjustability of the lamps 77a, 77b and 77c is to vary the strengths of color of the color value images of the film 21 which are superimposed, in one practice of the invention, on the single frame 85', Fig. 8, of the film 19 at the instant coinciding with the aperture 20 of the film advancing mechanism 13.

As shown in Fig. 1, the housing of the film mechanism 13 has thereon a lamp housing 86 having therein a lamp 87 aligned with the aperture 20 and being adapted to pass a beam of white light through condenser lenses 88 and thence leftwardly through the frame 85' of a film 19 disposed across the aperture 20 of the film advancing mechanism 13. The light box 75 and the lamp housing 86 are respectively provided with blowers 89 and 90 for circulation of cooling air therethrough.

As shown schematically in Figs. 3 and 8, the light directing means 14 comprises a casing 91 having in its end wall facing the film advancing mechanism 15, objective lenses 92, respectively indicated as 92a, 92b, and 92c and mirrors 97 and 98 are made from optical flats or pellicle mirrors, having a thickness of approximately two thousandths of an inch, so that the light passing diagonally therethrough will be offset an infinitesimal amount and therefore will not affect the practical registration of the images passing in superimposed relation along the axis 99. For focusing the images on the conjugate focal planes established by the films 19 and 21, the film handling mechanism 13 and the light directing means 14 are movable along the guides 12 of the table 10. For this relative focusing movement of the members 13 and 14, a shaft 110 is provided, this shaft extending parallel to the guide 12, and being rotatable in a block 111. On the leftward end of the shaft 110 there is a thread 112 of relatively fine pitch which engages the base 113 of the light directing means 14, and on the rightward end of the shaft 110 there is a screw thread 114 of coarser pitch which engages the base of the film advancing mechanism 13, and imparts to the film advancing mechanism 13 a higher rate of movement than that which is imparted by the screw thread 12 to the focusing device when the shaft 110 is rotated.

A further feature of the light directing means 14 is the provision of means to compensate for the difference in the length of the light path from the image 68c, Fig. 8, to the frame 85' and the length of the light paths from the images 68a and 68b to the frame 85'. It will be noted that the transverse axis 102 is of greater length than the transverse axis 100 and the transverse axis 101. To compensate for this, I make provision for the insertion of a thin optical flat between the lens elements, 116 and 117, of the objective lens 92c, Figs. 3, 11 and 12. Slots 118 are provided in the opposite side walls of the casing 118 of the lense 92c to receive a slide 119 having therein a plurality of thin graduated optical flats 119a so arranged that they may be brought into transverse relation to the optical axis 86 of the objective lens 92c substantially on the nodal point thereof. By placing an optical flat 119a of proper thickness across the optical axis 86, in accordance with the conjugate focal distances between the objective lenses 92 and the focal planes established by the films 19 and 21 or the film 21 and the screen 129, effective compensation of the light path consisting of the axes 86, 102 and 99, may be accomplished as required.

The groups of three frames 68 on the color separation film 21 are supported by a single emulsion supported on a single transparent Celluloid base.

As the result of this, shrinkage due to processing of the film carrying the complementary images 68 is substantially equalized throughout the entire film area so that when this shrinkage occurs, not only are the frames 68 substantially equally reduced in area, but they are moved radially inwardly toward a common point. Also, this film shrinkage accumulates in the positive color separation film. In the present practice of the invention, negative color value images are first photographed in the frames 68 of a color value negative. Shrinkage occurs in the processing of this color value negative film. It is then printed onto a positive color value sensitized film which is processed and shrinks as a result of the processing. For this reason it is stated that the shrinkage occurring in both the negative color separation film and the positive color separation film accumulates in the positive color separation film. An important feature of the invention resides in the provision of means to compensate for this shrinkage, such means embracing adjustability of the light directing means so as to move the separate optical axes 84, 85, and 86 inwardly or outwardly, as may be required, so that these axes 84, 85 and 86 will respectively impinge the centers of the frames 68a, 68b, and 68c. The details of this mechanism are shown in Figs. 10 to 14 inclusive, to which the following description applies.

The housing 91 has in its leftward end wall 130 rectangular openings 131 specifically identified as openings 131a, 131b, and 131c forming guides to receive the front walls 132 of carriages 133, specifically identified as carriages 133a, 133b and 133c, each of these carriages 133 having a longitudinal wall 134 extending rightwardly in parallel relation to the single optical axis 99 and having on the rightward ends thereof walls 135 which are slidable in guides 136, specifically identified by the numerals 136a, 136b, and 136c, in the rightward end wall 137 of the housing 91. The walls 132 of the carriages 133 have thereon projections 137 arranged to engage a cam 138 supported in the wall 130 of the housing 91, and the walls 135 at the rightward ends of the carriages 133 have projections 139 arranged to engage a cam 140 supported for longitudinal movement in the rightward end wall 137 of the housing 91. Springs 141 are disposed at the outer ends of the walls 132 and springs 142 are disposed at the outer ends of the walls 135, these springs urging the carriages 133 inward, so as to hold the projections 137 in engagement with the cam 138 and hold the projections 139 in engagement with the cam 140.

Figure 11:
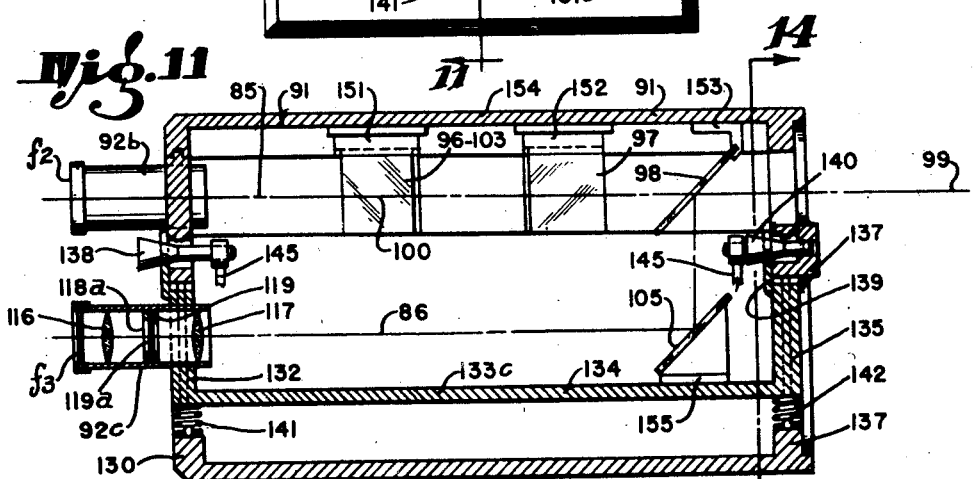
Fig. 11 is a sectional view taken as indicated by the line 11—11 of Fig. 10.
Figure 13:
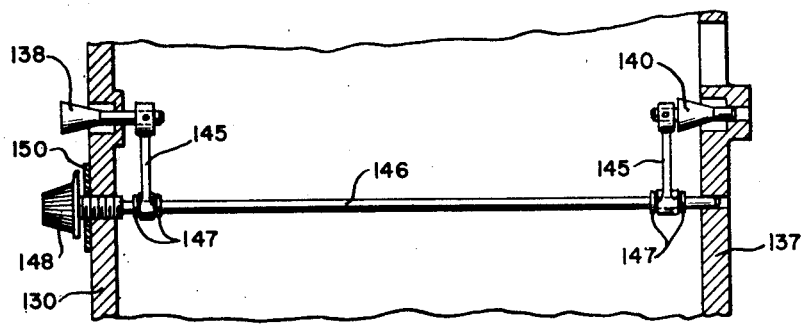
Fig. 13 is a fragmentary sectional view taken as indicated by the line 13—13 of Fig. 10, for showing details of adjusting means.
Figure 14:
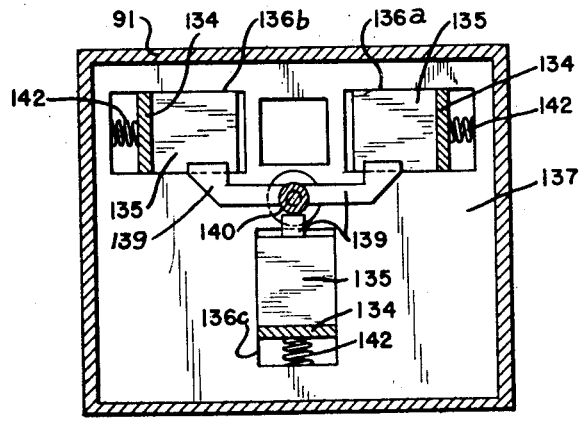
Fig. 14 is a view of the rightward end of the light directing means 14.

The cams 138 and 140 are linked together for simultaneous longitudinal movement, so that these cams will act to produce simultaneous in or out movement of the opposite ends of the carriages 133. For this simultaneous movement of the cams 138 and 140, as shown in Figs. 11 and 13, arms 145 are extended laterally from the cams 138 and 140 to engage the shank of a screw 146, between collars 147 which are arranged in pairs on the shank of the screw 146. The screw 146 is threaded through the wall 130 and has on its front end an operating means in the form of a knob 148 associated with a dial 150 to indicate the extent of movement of the carriages 133. When the screw 146 is rotated in clockwise direction, it will move the arms 145, Figs. 11 and 13, and the cams 138 and 140 in rightward direction, the cams then moving the carriages 133 outward against the yielding force of the springs 141 and 142. When the knob is rotated in counterclockwise direction, the cams 138 and 140 will be moved leftward, permitting the springs 141 and 142 to move the carriages 133 inwardly.

Figure 12:
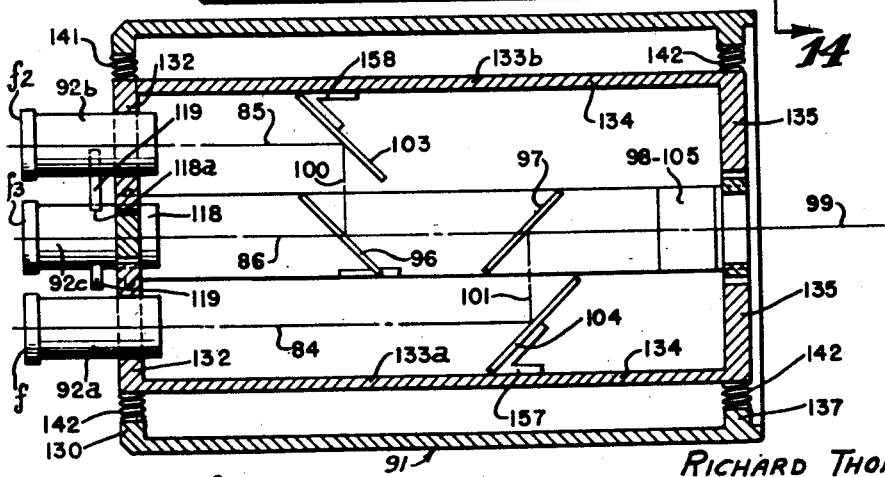
Fig. 12 is a sectional view taken as indicated by the line 12—12 of Fig. 10.

The mirrors 96, 97 and 98 are mounted by stationary brackets 151, 152 and 153 below the top horizontal wall 154 of the housing 91, as shown in Fig. 11. Also as shown in Fig. 11, the mirror 105 is supported on the carriage 133c by means of a bracket 155 and the lens 92c is supported in the front wall 132 of the carriage 133c so as to establish the axis 86. Accordingly, inward movement of the carriage 133c results in inward movement of the axis 86. As shown in Fig. 12, brackets 157 and 158 respectively support the mirrors 104 and 103 on the carriages 133a and 133b, and the lenses 92a and 92b are respectively supported in the front end walls 132 of the carriages 133a and 133b so as to define separate axes 84 and 85 which are moved inward and outward when the carriages 133a and 133b are given like movement by the cams 138 and 140. It is possible, by use of the adjustment described in the foregoing, to move the axes 84, 85 and 86 inward so that they will correspond to the spacing of the frames 68 in any color separation film 21 instantly in the film handling mechanism 15. For example, after a color separation positive film is obtained, the axes 84 and 85 and 86 may be adjusted so as to compensate for shrinkage therein.

My method of reproducing a positive colored motion picture film is performed as follows. The positive transparency which may be a motion picture film of triple emulsion type is run through the film handling mechanism 13, while at the same time an undeveloped sensitized negative film is advanced through the film handling mechanism 15. Referring to Fig. 8, the positive motion picture colored transparency may be represented by the film 19 and the undeveloped sensitized film may be represented by the film 21. After proper focusing, the lamp 87, Fig. 1, is electrically energized so that the beam of light will pass leftward through each consecutive frame 85' of the positive transparency, projecting the colored image of each frame leftward along a single optical axis. This beam of light or colored image will be divided into a plurality of divisional images by the light directing means 14 into three separate beams carrying the original image which will be focused by the objective lenses 92a, 92b and 92c and projected along the axes 94, 95 and 96 onto the consecutive sections or frames of the film 21, to photograph onto the sensitized emulsion thereof the color value images 68a, 68b and 68c. Owing to the fact that these images are passed respectively through the filters f, f2 and f3, disposed on the leftward end of the objective lenses 92a, 92b, and 92c, the images 68a, 68b, and 68c will represent only the respective colors of the original image of the motion picture transparency, as determined by the filters f, f2 and f3 employed. The next step in the process is to prepare from the exposed negative 21 a color separation positive film. This is done by developing the negative and then printing a positive film therefrom which will contain complementary positive color value images corresponding to the colored pictures of the original transparency. The next step in the process is to project the color value images of the positive color separation film thus obtained upon a screen in colored light and adjust the relative strengths of the lights passed through each of the color value images so as to obtain the desired color balance. This is accomplished by removing the film advancing mechanism 13 from the table 10, placing the color separation positive film in the film advancing mechanism 15, and then energizing the lamps 77a, 77b, and 77c of the light box 75 so as to pass beams of light rightwardly through the color value images of the positive color separation film now in the film advancing mechanism 15. The light directing means 14 will be then adjusted along the guides 12 of the table 10 so as to focus the composite colored image from the positive color separation film onto a screen 120, Fig. 1, disposed beyond the rightward end of the table 10, and the knob 148 is operated to move the separate optical axes 84, 85 and 86 inwardly so as to impinge the centers of the frames 68a, 68b, and 68c and thereby bring the color images on the screen 120 into superimposed or registered relation. Owing to the increase in the conjugate focal distances between the object images of the film in the device 15, the light directing means 14 and the screen 120, a relatively large colored image is formed. While observing this large colored image on the screen 120, the operator may adjust the resistances 84a, 84b, and 84c as required to give a suitable color composition in the colored image appearing on the screen 120. When this adjustment of the relative strengths of the light beams has been accomplished, the operator notes the relative light values on the calibrated dials of the resistances 84a, 84b, and 84c as a guide to light strengths to be employed during subsequent operations. The screen 120 may be placed at a greater distance from the film handling mechanism 15 than that shown in Fig. 1, if it is desired to obtain a larger colored motion picture image on a screen during the adjustment of relative light values.

The film handling mechanism 13 will be now replaced upon the table 10 and the light directing means 14 and the film handling mechanism 13 will be both adjusted with relation to the film handling mechanism 15 so that the color value images of the positive color value separation film may be projected in superimposed relation onto a sensitized undeveloped triple emulsion motion picture film in the film handling mechanism 13. With the lamps 77a, 77b, and 77c adjusted to proper intensity, the positive color value separation film and the undeveloped sensitized triple emulsion film may be simultaneously advanced through the mechanisms 13 and 15, thereby light-exposing the respective emulsions of the film in the film advancing mechanism 13 to the respective images which they are to receive from the positive film simultaneously advanced through the film advancing mechanism 15. Now, any desired number of reproductions of the original colored motion picture film may be obtained by running the required number of undeveloped sensitized triple emulsion color films through the film advancing mechanism in synchrony with the advancing of the master or positive color separation film through the mechanism 15. Colored motion picture reproductions of other sizes may be obtained by merely substituting for the film advancing mechanism, other film advancing mechanisms of proper size to handle the films from which the colored reproductions are to be made. The film handling mechanism 13 is of a size to handle the standard theatre motion picture film, and the film 21 employed in the color separation film advancing mechanism 15 is of 65 millimeter size so that the color value images 68a, 68b and 68c may be of increased size so as to obtain exceptionally good color image definition.

Regardless of whether the master or positive color separation film employed in the mechanism 15 is obtained from a colored transparency in the mechanism 13 or from a color separation negative film photographed in a camera, the invention enables the balancing of color values through adjustment of the lamps 77a, 77b and 77c as hereinbefore described.

I claim as my invention:

1. A method of making colored motion picture films, comprising: preparing an original colored motion picture film comprising consecutive frames containing colored images; projecting the colored images along a single optical axis; dividing the light of said images so as to produce a plurality of divisional images and projecting the divisional images thus obtained along separate axes to side by side color separation areas on a negative color separation film; filtering said divisional images so as to produce color separation images in said color separation areas; preparing a positive color separation film from said negative film, said positive color separation film having positive color separation images; projecting said positive color separation images in colored lights in reverse direction along separate axes and combining them into a composite colored image which is projected along a single optical axis onto a screen in superimposed relation so as to form a colored image; observing the relative values of the colors comprising said images and adjusting the intensity of at least one of the colored lights so as to produce a desired color composition in the colored image on the screen; then projecting said colored images along said separate axes and said single optical axis onto the frames of a multiple emulsion motion picture film; and processing said multiple emulsion film to form complementary colored images in the respective emulsions thereof.

2. A method of making colored motion picture films, comprising: preparing an original colored motion picture film comprising consecutive frames containing colored images by exposing in a camera a sensitized emulsion motion picture film and processing the same; projecting the colored images along a single optical axis; dividing the light of said images so as to produce a plurality of divisional images and projecting the divisional images thus obtained along separate axes to side by side color separation areas on a negative color separation film; filtering said divisional images so as to produce color separation images in said color separation areas; preparing a positive color separation film from said negative film, said positive color separation film having positive color separation images; projecting said positive color separation images in colored lights in reverse direction along separate axes and combining them into a composite colored image which is projected along a single optical axis onto a screen in superimposed relation so as to form a colored image; observing the relative values of the colors comprising said images and adjusting the intensity of at least one of the colored lights so as to produce a desired color composition in the colored image on the screen; then projecting said colored images along said separate axes and said single optical axis onto the frames of a multiple emulsion motion picture film; and processing said multiple emulsion film to form complementary colored images in the respective emulsions thereof.

3. A method of making colored motion picture films, comprising: preparing an original colored motion picture film comprising consecutive frames containing colored images; projecting the colored images along a single optical axis; dividing the light of said images so as to produce a plurality of divisional images and projecting the divisional images thus obtained along separate axes to side by side color separation areas on a negative color separation film; filtering said divisional images so as to produce color separation images in said color separation areas; preparing a positive color separation film from said negative film, said positive color separation film having positive color separation images; adjusting said separate axes relatively inwardly toward a common point to compensate for the effects of shrinkage accumulating in said positive film; projecting said positive color separation images in colored lights in reverse direction along said separate axes and combining them into a composite colored image which is projected along said single optical axis onto a screen in superimposed relation so as to form a colored image; observing the relative values of the colors comprising said images and adjusting the intensity of at least one of the colored lights so as to produce a desired color composition in the colored image on the screen; then projecting said colored images along said separate axes and said single optical axis onto the frames of a multiple emulsion motion picture film; and processing said multiple emulsion film to form complementary colored images in the respective emulsions thereof.

4. A method of making colored motion picture films, comprising: preparing an original colored motion picture film comprising consecutive frames containing colored images; projecting the colored images along a single optical axis; dividing the light of said images so as to produce a plurality of divisional images and projecting the divisional images thus obtained along separate axes to side by side color separation areas of a focal plane; filtering said divisional images so as to produce color separation images in said color separation areas; utilizing the images formed in said areas to produce a color separation motion picture film having color separation images in side by side relation; projecting said color separation images in color corrective colored lights in reverse direction along separate axes and combining them into a composite color corrected colored image which is projected along a single optical axis onto a multiple emulsion motion picture film; and processing said multiple emulsion film to form complementary colored images in the respective emulsions thereof.

5. A method of making colored motion picture films, comprising: preparing an original colored motion picture film comprising consecutive frames containing colored images; projecting the colored images along a single optical axis; dividing the light of said images so as to produce a plurality of divisional images and projecting the divisional images thus obtained along separate axes to side by side color separation areas of a focal plane; filtering said divisional images so as to produce color separation images in said color separation areas; utilizing the images formed in said areas to produce a color separation motion picture film having color separation images in side by side relation; adjusting said separate axes relatively inwardly toward a common point to compensate for the effects of shrinkage accumulating in the color separation motion picture film; projecting said color separation images in colored lights in reverse direction along said separate axes and combining them into a composite colored image which is projected along said single optical axis onto a screen in superimposed relation so as to form a colored image; observing the relative values of the colors comprising said images and adjusting the intensity of at least one of the colored lights so as to produce a desired color composition in the colored image on the screen; then projecting said colored images along said separate axes and said single optical axis onto the frame of a multiple emulsion motion picture film; and processing said multiple emulsion film to form complementary colored images in the respective emulsions thereof.

6. A method of making colored motion picture films, comprising: preparing an original colored motion picture film comprising consecutive frames containing colored images; projecting the colored images along a single optical axis; dividing the light of said images so as to produce a plurality of divisional images and projecting the divisional images thus obtained along separate axes to side by side color separation areas on a negative color separation film; filtering said divisional images so as to produce color separation images in said color separation areas; preparing a positive color separation film from said negative film, said positive color separation film having positive color separation images; projecting said positive color separation images in colored lights in reverse direction along separate axes and combining them into a composite colored image which is projected along a single optical axis onto a screen in superimposed relation so as to form a colored image; observing the relative values of the colors comprising said images and relatively varying the source intensities of the colored lights so as to produce a desired color composition in the colored image on the screen; then projecting said colored images along said separate axes and said single optical axis onto the frames of a multiple emulsion motion picture film; and processing said multiple emulsion film to form complementary colored images in the respective emulsions thereof.

7. A method of making colored motion picture films, comprising: preparing an original colored motion picture film comprising consecutive frames containing colored images; projecting the colored images along a single optical axis; dividing the light of said images so as to produce a plurality of divisional images and projecting the divisional images thus obtained along separate axes to side by side color separation areas on a negative color separation film; filtering said divisional images so as to produce color separation images in said color separation areas; preparing a positive color separation film from said negative film, said positive color separation film having positive color separation images; projecting said positive color separation images in colored lights in reverse direction along separate axes and combining them into a composite colored image which is projected along a single optical axis onto a screen in superimposed relation so as to form a colored image; observing the relative values of the colors comprising said images and relatively varying the source intensities of the colored lights so as to produce a desired color composition in the colored image on the screen; then projecting said colored images, while maintaining the adjusted intensities of said lights, along said separate axes and said single optical axis onto the frames of a multiple emulsion motion picture film; and processing said multiple emulsion film to form complementary corrected colored images in the respective emulsions thereof.

RICHARD THOMAS.

REFERENCES CITED

The following references are of record in the file of this patent:

UNITED STATES PATENTS

| Number | Name | Date |
|---|---|---|
| 435,271 | Abbe et al. | Aug. 26, 1890 |
| 1,161,910 | Ulysse | Nov. 30, 1915 |
| 1,317,825 | Saunders | Oct. 7, 1919 |
| 1,361,012 | Capstaff | Dec. 7, 1920 |
| 1,580,115 | Brewster | Apr. 13, 1926 |
| 1,637,917 | Richter | Aug. 2, 1927 |
| 1,880,596 | Tuttle | Oct. 4, 1932 |
| 1,933,787 | Capstaff | Nov. 7, 1933 |
| 2,140,024 | Merte | Dec. 13, 1938 |
| 2,144,457 | Horst | Jan. 17, 1939 |
| 2,402,660 | O'Grady | June 25, 1946 |

FOREIGN PATENTS

| Number | Country | Date |
|---|---|---|
| 110,964 | Great Britain | Nov. 15, 1917 |
| 272,288 | Great Britain | June 9, 7927 |
| 796,677 | France | Jan. 27, 1936 |

Certificate of Correction

Patent No. 2,491,018     December 13, 1949

RICHARD THOMAS

It is hereby certified that errors appear in the printed specification of the above numbered patent requiring correction as follows:

Column 6, line 70, for "screen 129" read *screen 120*; column 14, line 13, list of references cited, for "June 9, 7927" read *June 9, 1927*;

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*